United States Patent [19]

Kishimoto

[11] Patent Number: 5,109,553

[45] Date of Patent: May 5, 1992

[54] SHOWER UTENSIL HAVING BRUSH

[75] Inventor: Shunichi Kishimoto, Osaka, Japan

[73] Assignee: Azz International Co., Ltd., Osaka, Japan

[21] Appl. No.: 631,147

[22] Filed: Dec. 20, 1990

[30] Foreign Application Priority Data

Dec. 28, 1989 [JP] Japan .................................. 1-344650

[51] Int. Cl.$^5$ ...................... A45D 19/02; A46B 11/06
[52] U.S. Cl. .......................................... 4/518; 4/515;
   401/42; 401/289; 239/304; 239/428.5
[58] Field of Search ................... 4/515, 516, 517, 518,
   4/567, 569; 401/42, 43, 40, 41, 46, 289;
   239/378, 304, 305, 428.5, 444; 132/212, 112,
   113, 114, 116, 272; 119/85, 83, 158

[56] References Cited

U.S. PATENT DOCUMENTS

| | | | |
|---|---|---|---|
| 1,191,578 | 7/1916 | Englund | 401/289 |
| 1,760,018 | 5/1930 | Soss | 401/46 |
| 2,250,878 | 7/1941 | Quaranti | 15/526 |
| 2,584,631 | 2/1952 | Soss | 401/43 |
| 3,066,683 | 12/1962 | Pace | 132/114 |
| 3,271,809 | 9/1966 | Morawski | 15/526 |
| 3,463,170 | 8/1969 | McCullough | 132/113 |
| 4,027,984 | 6/1977 | Underwood | 401/28 |
| 4,211,368 | 7/1980 | Legros et al. | 239/428.5 |
| 4,236,840 | 12/1980 | Kennedy | 401/42 |
| 4,573,639 | 3/1986 | Logue | 239/428.5 |
| 4,830,790 | 5/1989 | Stevenson | 239/428.5 |
| 4,895,468 | 1/1990 | Chappell | 401/42 |

FOREIGN PATENT DOCUMENTS

| | | | |
|---|---|---|---|
| 546104 | 10/1922 | France . | |
| 1208189 | 9/1959 | France | 4/159 |
| 677741 | 8/1952 | United Kingdom . | |
| 746957 | 3/1956 | United Kingdom . | |
| 924329 | 4/1963 | United Kingdom . | |
| 947622 | 1/1964 | United Kingdom . | |

Primary Examiner—William A. Cuchlinski, Jr.
Assistant Examiner—John L. Beres
Attorney, Agent, or Firm—William H. Eilberg

[57] ABSTRACT

The invention provides a shower utensil having a brush and adapted to rapidly and efficiently shampoo pet animals having a large quantity of long hair or persons. The utensil is characterized in that in addition to bristles formed on the outer surface of a water spray wall on the bottom side of a main body container, at least one hollow projection having a hollow portion in communication with the interior of the container is formed on the outer surface of the water spray wall for forcing out water from its outer end.

Since water is forced out from the hollow projection as positioned deep in the inner portion of the hairy covering of the animal, i.e., close to the skin, the covering of large amount of long hair can be rapidly soaked with the washing water or shampoo preparation fully to the skin.

19 Claims, 5 Drawing Sheets

SHOWER UTENSIL HAVING BRUSH

BACKGROUND OF THE INVENTION

1. Field of the Invention

The present invention relates to shower utensils having a brush, and more particularly to shower utensils equipped with a brush and suitable for washing the hair of pet animals and human hair.

2. Description of the Prior Art

In the case where pet animals, especially cats or dogs having long hair are kept with free access allowed to the interior and outside of houses, it is important to wash the body of the pet animal periodically sometimes with shampoo in order to keep the pet animal clean and the interior sanitary.

For washing the bodies of such pet animals, it is usual practice to wash the hair as with a brush while applying water to the body with a hose or the like.

However, it is difficult to speedily wash the body of the pet animal, especially those with long hair, so that these pet animals not infrequently dislike having the body washed.

In the case of pet animals with long hair, it is difficult to make the hairy covering fully soaked with water to the skin even if the water is applied with the hose or the like. Accordingly, water is forced out from the hose against the body of the pet animal, whereas the animal dislikes being splashed with water. When the animal is shampooed with use of a brush, the lather must be washed away by applying a jet of water to the hair.

Thus, pet animals are washed generally by applying water to the body first, then washing the hair with a brush and shampoo solution and finally applying water to the body again to wash the lather or solution away. However, any person who has ever kept a pet animal is aware that this method is inefficient and therefore makes the animal dislike washing.

The same is true of the case wherein infants are shampooed by their parents. Infants hate water splashing their eyes when water is poured down over the head during shampoo. Thus, shampoo is generally cumbersome work.

SUMMARY OF THE INVENTION

Accordingly, an object of the present invention is to provide a shower utensil having a brush and adapted to wash the bodies of pet animals with long hair efficiently within a short period of time without giving fear.

Another object of the present invention is to provide a shower utensil having a brush and suitable for washing pet animals with water and subsequent shampoo.

Still another object of the present invention is to provide a shower utensil equipped with a brush and a valve for stopping the flow of water therethrough so as to facilitate shampoo with the flow of water stopped.

To accomplish the above objects, the present invention provides a shower utensil having a brush for use in washing the bodies of pet animals with long hair or human hair, the shower utensil comprising:
a main body container having at one end a joint portion connectable to a hose and a water spray wall,
a water guide space formed within the main body container and communicating with the joint portion, the water guide space being defined by the inner surface of the water spray wall,
a plurality of bristles projecting outward from the outer surface of the water spray wall, and
at least one hollow projection formed on the outer surface of the water spray wall and having a hollow portion in communication with the water guide space.

According to a preferred embodiment, the shower utensil further comprises:
a liquid containing space formed within the main body container and partitioned from the water guide space, and
liquid dispenser means for delivering a liquid from inside the liquid containing space to the outer surface of the water spray wall.

The shower utensil can further be provided with a valve for permitting water to flow from the joint portion into the water guide space or stopping the flow.

The liquid containing space can be used as a space for accommodating a shampoo preparation or as a space for accommodating a conditioner (rinse) for human hair.

With the shower utensil of the invention equipped with a brush and having the above construction, water is admitted into the water guide space from the joint portion connected to a hose, whereupon the water is forced out from the guide space in the form of a shower through nozzle orifices formed in the water spray wall. The water is forced out also from the tip of the hollow projection.

When water is thus forced out from the shower utensil as placed into the hairy covering of a pet animal, the hollow projection projected into the covering jets out water from its tip, so that even if the animal has long hair, the washing water can be jetted out at the innermost portion of the hairy covering close to the skin. Consequently, the hair of the animal can be speedily soaked with the water t the skin entirely unlike the case wherein water is merely applied from outside.

Since the water is jetted out from the tip of the hollow projection as positioned close to the skin as stated above, the hair can be urged to a raised position by the jet of water at the same time. Accordingly, if the shower utensil of the invention is moved in this state as if brushing the hair, the skin or hair of the animal can be washed effectively, even with a massage also given to the skin at the same time.

Further because the body of the pet animal is washed with the water jetted out from the hollow projection at the deep portion of the hairy covering with the shower utensil pressed against the body, the washing water will not splash about. Consequently, the pet can be washed smoothly without the likelihood of wetting the garment of the user with splashes or without giving fear to the pet.

The shower utensil of the present invention has the liquid containing space for accommodating a shampoo preparation or the like, and the liquid dispenser means for delivering the shampoo preparation or the like from the space to the outside through the water spray wall, so that the washing with water in the above-mentioned mode can be immediately followed by shampoo. Moreover, the hair of the pet animal can be further washed as raised as described above. This causes the shampoo preparation to lather profusely for efficient shampoo.

Subsequently in rinsing, water is jetted out from the tip of the hollow projection close to the skin to apply the rinse to the deep portion of the hairy covering close to the skin of the pet, whereby the preparation and dirt can be washed away effectively.

In this way, pet animals with long hair can be washed with water, shampooed and rinsed very efficiently without splashes which would scare the animal or wet the garment of the user. The fact that the present utensil is less likely to produce splashes that would scare the animal is very important in washing the body of the pet animal smoothly. If scared by splashes or the like, the animal becomes wild in the shower bath and consequently becomes difficult to wash. Being free of such a problem, the shower utensil of the invention is smoothly usable for washing the body of the pet to his satisfaction.

The body of the animal can be washed more smoothly when the utensil is provided with the valve for permitting water to flow from the joint portion connected to a hose into the water guide space of the main body container or stopping the water flow, because while handling the shower utensil, the valve can be manipulated with the hand gripping the utensil to cause the shampoo preparation to lather with the flow of water stopped when washing with water is to be followed by shampoo and to thereafter permit water to flow again for rinsing without manipulating the faucet of the water supply.

Of course the shower utensil of the present invention is suitable not only for washing the hair of pet animals as described above but also for shampooing infants and females since the supply and interruption of water flow, application of the shampoo preparation and brushing for washing can all be accomplished with the hand gripping the utensil.

Apparently, the hair of infants can be washed with water, shampooed and rinsed efficiently without giving fear to the infant by splashes as in washing the hair of pet animals.

Other objects, features and advantages of the present invention will become apparent from the detailed description thereof given below with reference to the accompanying drawings.

DETAILED DESCRIPTION

Figure 1:
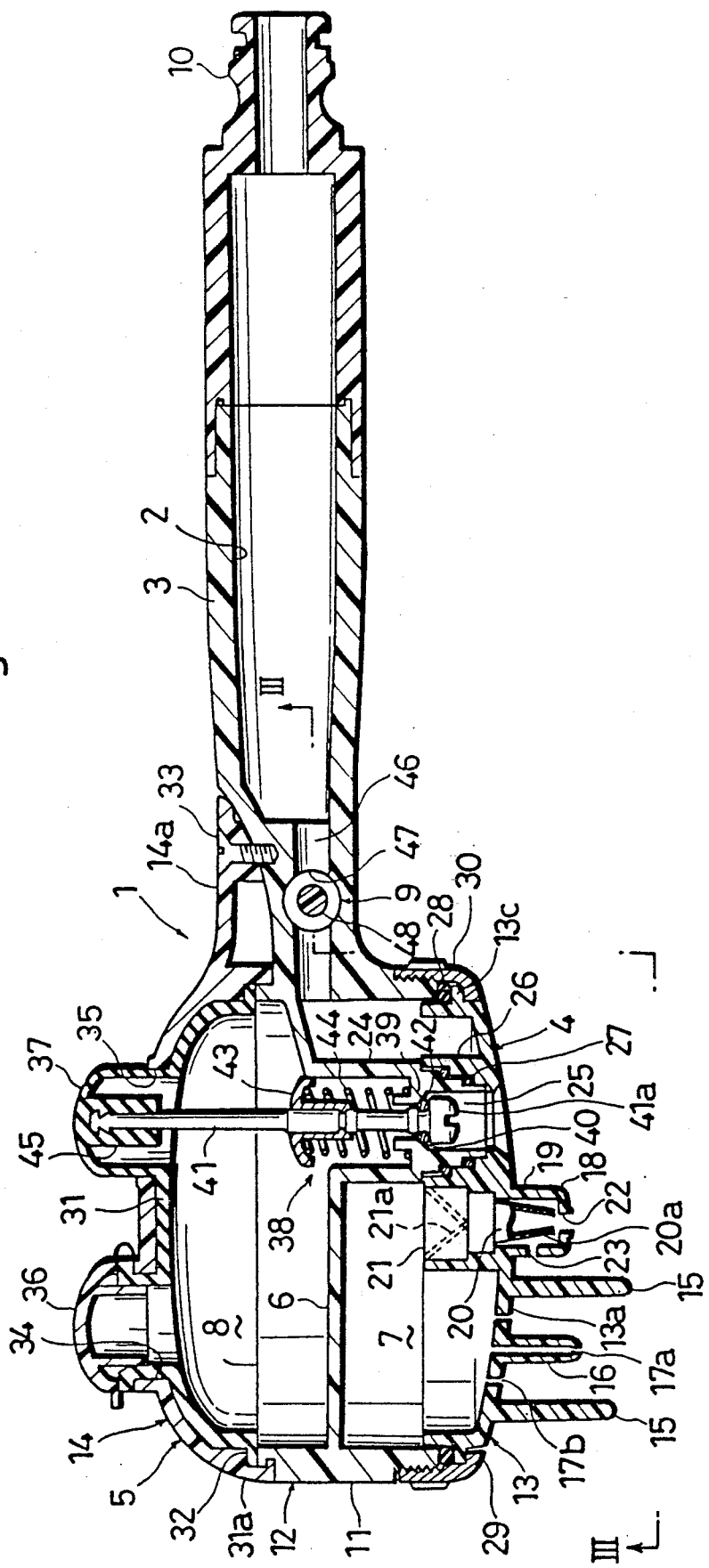
FIG. 1 is a view in vertical section of a first embodiment of the invention.
Figure 2:
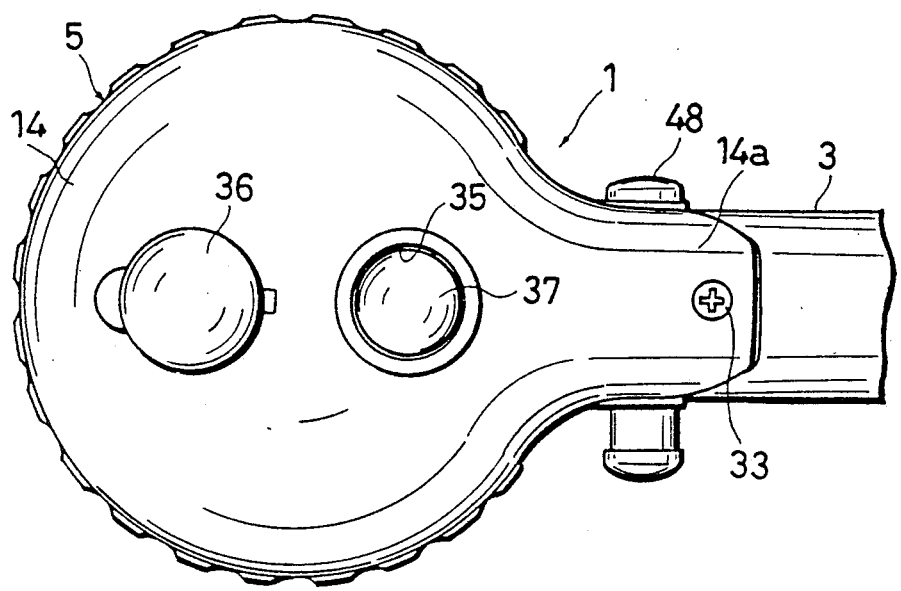
FIG. 2 is a fragmentary plan view of the first embodiment.

Preferred embodiments of the present invention will be described below in detail with reference to the accompanying drawings.

FIGS. 1 to 4 show the first of the embodiments.

The first embodiment, i.e., shower utensil 1 having a brush, consists generally of a hollow grip 3 internally provided with a water conduit 2, and a main body container 5 joined to the base end of the grip 3 and having a water spray wall 4 on its bottom side.

The interior space of the main body container 5 is divided by a partition 6 into a lower water guide space 7 defined by the water spray wall 4, and an upper liquid containing space 8. The lower water guide space 7 communicates via a valve 9 with the water conduit 2 inside the grip 3. The outer end of the grip 3 has a joint portion 10 for connection to an unillustrated hose.

The container 5 is generally in the form of a hollow cylinder. For convenience of assembly, the container 5 is formed by assembling separate members, i.e., a main member 12 having a hollow cylindrical outer peripheral wall 11 and the partition 6, a brush member 13 providing the water spray wall 4, and a closure member 14 cooperating with the outer peripheral wall 11 and the partition 6 of the main member 12 to define the liquid containing space 8. The main member 12 is integral with the grip 3. These main member 12, brush member 13 and closure member 14 can be prepared, for example, by molding a resin.

The brush member 13 includes a base 13a generally in the form of a disk and having an outer surface slightly bulging out downward. The base 13a is integrally formed on its outer surface with a plurality of bristles 15 having a predetermined length and with a plurality of hollow projections 16 having a slightly shorter length than the bristles 15. The interior of each hollow projection 16 is in communication with the water guide space 7, and the tip of the projection 16 is formed with a nozzle orifice 17a of reduced diameter for spraying water therethrough.

With the present embodiment, the disklike base 13a of the brush member 13 is also formed with nozzle orifices 17b for holding the water guide space 7 in communication with the outside and forming a shower. Whether the nozzle orifices 17b are to be formed in the base 13a is a matter of choice.

The brush member 13 of the present embodiment is further formed centrally thereof with a hollow projection 18 which is different from the projection 16 in construction and which is adapted to force out therethrough a jet of mixture of air and water. More specifically, the central portion of the base 13a of the brush member 13 has a tubular holder 19 formed integrally therewith and projecting outward from the base outer surface by a predetermined length. Fitted in the holder 19 are a nozzle piece 20 having a nozzle 20a tapered downward with a decreasing diameter, and a member 21 for regulating the flow of water to be introduced into the nozzle piece 20. The tubular holder 19 is formed with a nozzle orifice 22 in its outer end wall (bottom wall) and an air inlet port 23 in its side wall. A predetermined clearance is formed between the bottom wall of the holder 19 having the nozzle orifice 22 and the end of the nozzle piece 20. Thus, the air inlet port 23 is in communication with the interior of the nozzle piece 20.

The flow regulating member 21 has, between the inlet and outlet thereof, a flow regulating wall 21a twisted through 90 degrees about its axis. Accordingly the water flowing through the flow regulating member 21 into the nozzle piece 20 is given a helical motion. The helical flow thus produced inside the nozzle piece 20 is given an increased velocity in the vicinity of the nozzle end due to the reduction in the diameter of the nozzle piece 20, consequently creating a negative static pressure inside the end wall of the nozzle piece 20 and thereby admitting air into the holder through the air inlet port 23. The air thus admitted is mixed with the flow of water forced out from the end of the nozzle piece 20, and the mixture is jetted out through the nozzle orifice 22.

Since the helical flow of water is produced inside the nozzle piece 20 by the flow regulating member 21, the flow velocity inside the peripheral wall of the nozzle piece close to its end is accelerated by being influenced by the centrifugal force of the helical flow to further increase the negative pressure created inside the peripheral end wall of the nozzle piece. As a result, the effect then achieved to mix the air with the water flow is exceedingly greater than when the flow regulating member 21 is absent.

Thus, water is forced out with air entrained therein from the hollow projection 18 projecting by the predetermined length from the base 13a of the brush member 13 and having a special construction according to the present embodiment.

The brush member 13 has a tubular portion 26 formed on its inner surface and cooperative with a tubular portion 24 extending downward from the partition 6 to define a passage 25 which is separated from the water guide space 7 and through which a shampoo preparation or like liquid is led out from the liquid containing space 8 onto the lower surface of the brush member 13.

When the brush member 13 is attached to the main member 12 of the main body container 5, the tubular portion 6 is fitted to the tubular portion 24 formed on the partition 6 with the joint therebetween sealed off. More specifically, an O-ring 27 is interposed between the tubular portions 24 and 26 fitted together.

A flange 13c is formed along the outer periphery of the brush member 13 thus constructed. With an O-ring 28 provided between the lower end of the cylindrical outer peripheral wall 11 of the main member 12 and the flange 13c, a fastening ring 30 having an inward flange 29 for engaging the flange 13c from below is screwed on the lower end of the cylindrical outer peripheral wall 11, whereby the brush member 13 is attached to the main member 12.

The liquid containing space 8 is formed by joining the closure member 14 to the upper portion of the main member 12. Fitted to the inner surface of the closure member 14 is an inner cover 31 made of rubber and having a flange 31a along its outer periphery. The liquid containing space 8 is liquid-tightly sealed off from outside basically by the inner cover 31 of rubber.

The outer peripheral flange 31a of the inner cover 31 is clamped between the top of the peripheral wall 11 of the main member 12 and a stepped portion 32 formed in the inner periphery of the closure member 14, whereby the joint of the main member 12 and the closure member 14 is sealed off. The closure member 14 is attached to the top portion of the peripheral wall 11 of the main member 12 by a so-called bayonet mount. The closure member 14 further has an extension 14a extending over the upper side of the base end of the grip 3. The extension 14a is fastened to the grip 3 with a screw 33, whereby the closure member 14 is prevented from rotating inadvertently to unfasten the bayonet mount.

The closure member 14 has two openings 34 and 35 formed in its top wall. One of the openings, 34, serves as an inlet for placing the shampoo preparation or like liquid into the liquid containing space 8 therethrough. A rubber tubular portion integral with the inner cover 31 extends along the wall inner periphery defining the opening 34. The opening 34 can be closed with a cap 36.

A deformable push button 37 integral with the inner cover 31 of rubber and formed by bulging the cover outward is projected outward through the other opening 35. The push button 37 functions as a manipulating portion for the liquid dispenser means 38 to be described later and adapted to deliver the shampoo preparation or like liquid from inside the space 8 onto the lower surface of the brush member 13 via the passage 25.

According to the present embodiment, the liquid dispenser means 38 has the following construction. The tubular portion 24 integral with the partition 6 and extending downward therefrom has an inward flange 39 on its inner periphery. A conical valve seat 40 is formed on the lower surface of the inward flange 39 inwardly thereof. A valve shaft 41 reciprocatingly movable axially thereof extends vertically through the central hole defined by the inward flange 39 and through the tubular portion 24. The valve shaft 41 has a diameter smaller than the inside diameter of the inward flange 39. The valve shaft 41 is formed at its lower end with a large-diameter portion 41a having an outside diameter larger than the inside diameter of the inward flange 39. The large-diameter portion 41a functions as a valve body which, when in intimate contact with the valve seat 40, prevents the passage of liquid through the central hole of the inward flange 39. According to the present embodiment, the large-diameter portion 41a has fitted around its neck an O-ring 42, which comes into intimate contact with the valve seat 40 to give the valve an improved shutting-off function.

A coiled compression spring 44 provided between the inward flange 39 and a flange 43 disposed at an axially intermediate portion of the valve shaft 41 always biases the shaft 41 upward in FIG. 1, i.e., in the valve closing direction, to hold the large-diameter portion 41a in intimate contact with the valve seat 40. In the usual state, therefore, the valve shaft 41 holds the central hole of the inward flange 39 closed.

The position of the flange 43 relative to the valve shaft 41 axially thereof is so determined that a clearance is formed between the flange 43 and the partition 6 when the valve shaft 41 is in the valve closing position, i.e., at the upper limit of its stroke as shown in FIG. 1. The upper end of the valve shaft 41 is inserted in and joined to a boss portion 45 formed inside the push button 37 projecting outward through the opening 3 in the closure member 14.

When the push button 37 is depressed to force the valve shaft 41 downward, the large-diameter portion 41a of the valve shaft is moved out of contact with the valve seat 40 to open the valve, permitting the liquid containing space 8 to communicate with the outside of the lower surface of the brush member 13 via the passage 25. Furthermore, the flange 43 serves as a piston, positively delivering the shampoo preparation or like liquid from inside the tubular portion 24 onto the lower surface of the brush member 13. When the push button 37 is released from the pressure, the valve shaft 41 is upwardly moved by the restoring force of the coiled compression spring 44, causing the large-diameter portion 41a to close the central hole of the inward flange 39.

According to the present embodiment, the valve 9 provided at the base portion of the grip 3 for permitting water to flow from the water conduit 2 into the water guide space 7 in the main body container 5 or stopping the flow has the following construction.

Figure 3:
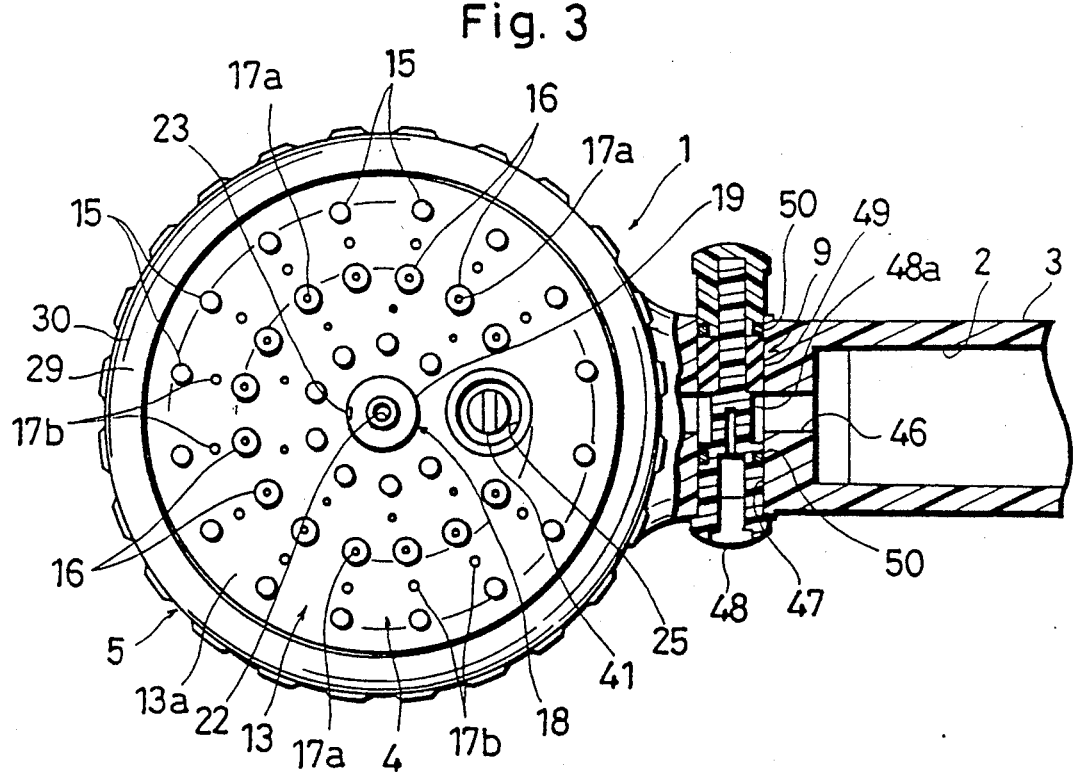
FIG. 3 is a view of the same as it is seen in the direction of arrows III—III in FIG. 1.

The base portion of the grip 3 is formed with a water channel 46 having a relatively small diameter for holding the water conduit 2 in communication with the lower water guide space 7 in the container 5. A guide bore 47 intersecting the water channel 46 at right angles therewith extends through the grip base portion. A rodlike valve member 48 is inserted through the guide bore 47 and is slidable axially thereof by hand. The valve member 48 is formed locally axially thereof with a small-diameter portion 48a as shown in FIG. 3. Adjacent to the small diameter portion 48a axially thereof, a tubular rubber packing 49 having an outside diameter corresponding to the inside diameter of the guide bore 47 is fitted around the valve member 48. Outside the portion of the valve member 48 where the small-diameter portion 48a and the rubber packing 49 are provided, the member 48 has sealing O-rings 50 and 51 for preventing water from flowing out through a small clearance in the guide bore 47 around the valve member 48.

When the small-diameter portion 48a is in register with the water channel 46 as seen in FIG. 3, the water admitted into the water channel 46 from the water conduit 2 inside the grip 3 flows around the small-diameter portion 48a to the outlet of the channel 46 and further flows into the lower water guide space 7 in the main body container 5.

Figure 4:
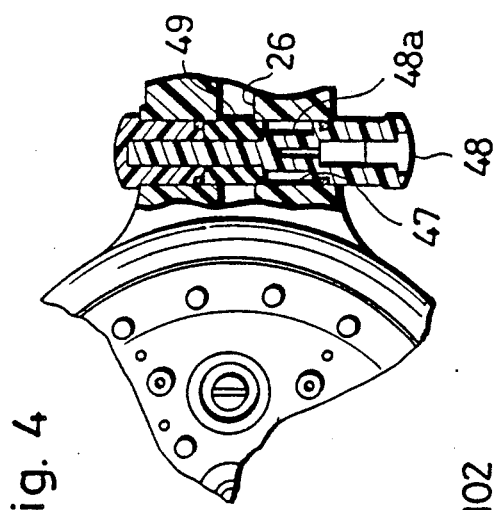
FIG. 4 is a view corresponding to FIG. 3 and illustrating the operation of a valve.

On the other hand, when the rubber packing 49 on the valve member 48 is in register with the water channel 46 as shown in FIG. 4, the packing 49 blocks the water channel 46 to prevent the water from flowing through the channel 46.

The valve member 48 is thus shiftable readily by alternately depressing opposite ends of the member 48 projecting beyond opposite sides of the base portion of the grip 3.

The brush-equipped shower utensil of the present embodiment will be used in the following manner.

An unillustrated hose connected to a suitable faucet of the water supply is connected to the joint portion 10 of the grip 3. The faucet of the water supply is left open in advance since the supply of water to the water guide space 7 of the utensil can be effected or interrupted by the valve 9 attached to the utensil.

When the valve 9 is opened, the water introduced into the water conduit 2 of the grip 3 from the hose is admitted into the water guide space 7 of the container 5 through the water channel 46 and is forced out owing to the water pressure from the nozzle orifices 17b formed in the base 13a of the brush member 13, the nozzle orifices 17a in the tips of the hollow projections 16 and the nozzle orifice 22 in the tip of the central hollow projection 18. As already stated, a mixture of water and air is jetted out from the central hollow projection 18 at an increased velocity.

When the shower utensil is moved as in brushing in pressing contact, for example, with the body of a pet animal having long hair while allowing water to be forced out from the brush member 13, the water jets out from the nozzle orifices 17a, 22 of the hollow projections 16, 18 as positioned deep in the hairy covering of the animal close to the skin, so that the covering can be soaked with the washing water rapidly to the skin although the hair is long.

With the hairy covering thus fully soaked with the washing water, the push button 37 is depressed, whereby the shampoo preparation accommodated in the liquid containing space 8 is applied dropwise to the hair from the lower surface of the brush member 13 in a suitable amount. The preparation is caused to fully lather by moving the utensil. The hair is thus washed with use of the shampoo preparation and brushing while suitably controlling the amount of water supply by manipulating the valve 9.

Since the shower utensil itself has the function of applying the shampoo preparation, the washing with water can be followed by shampoo without interruption, hence a high efficiency.

Furthermore, the water forced out from the hollow projection 18 contains air bubbles, which cause the shampoo preparation to fully lather to achieve an improved washing effect.

After the completion of shampoo, the valve 9 is fully opened again to force out a shower from the lower surface of the brush member 13 to rinse the hair of the pet animal.

The water forced out from the tips of the hollow projections 16, 18 penetrates deep into the hairy covering also in this case, with the result that the shampoo preparation or dirt can be speedily washed away from the position close to the skin.

In the case where the hair of the pet animal is washed with water or rinsed by brushing with the present utensil while allowing water to jet out from the brush member 13 as described above, the water is forced out from the tips of the hollow projections 16, 18 as positioned deep in the inner portion of the hairy covering. This obviates the likelihood that the water will splash about and consequently alleviates the problem that splashes will scare the pet animal or wet the garment of the user. Thus, the shampoo utensil of the present embodiment is adapted to efficiently and rapidly shampoo pet animals, especially those having a large quantity of long hair, without giving fear to the animal.

FIGS. 5 to 8 show a second embodiment of the present invention.

The brush-equipped shower utensil 101 of the second embodiment comprises a hollow main body container 105 integrally provided with a grip 103. The container 105 has inside thereof a water conduit 102 having one end connectable to a hose, a cock valve 109 for permitting water to flow through the conduit 102 or stopping the flow, and a shampoo tank 108 for accommodating a shampoo preparation or the like. The water introduced into the large hollow portion of the container from the water conduit 102 is forced out through a water spray wall 104.

The main body container 105 of large diameter is generally in the form of a hollow cylinder and has a partition 106 at its lower portion. A brush member 113 is attached to the lower end of the cylindrical portion of the container 105 in the same manner as in the first embodiment described, i.e., with a fastening ring 130.

The cock valve 109 is connected to the water conduit 102 extending through the grip 103. An elbow 146 is provided between the outlet of the cock valve 109 and the partition 106. Thus, the water conduit 102 communicates through the cock valve 109 and elbow 146 with a water guide space 107 formed in the lower portion of the container 105 and defined by the partition 106 and the brush member 113.

The cock valve 109 has a valve member 109a which is rotatable by a lever 109b provided on the top of the container 105. This lever 109b can be easily manipulated by the hand grasping the grip 103.

The brush member 113 of the second embodiment is not provided with the central hollow projection described with reference to the foregoing first embodiment and having the function of incorporating air into water, but has a suitable number of hollow projections 116 extending from the base 113a of the brush member 113 and similar to those indicated at 16 in the first embodiment. Of course, the brush member 113 has a suitable number of bristles 115 integral therewith.

Figure 5:
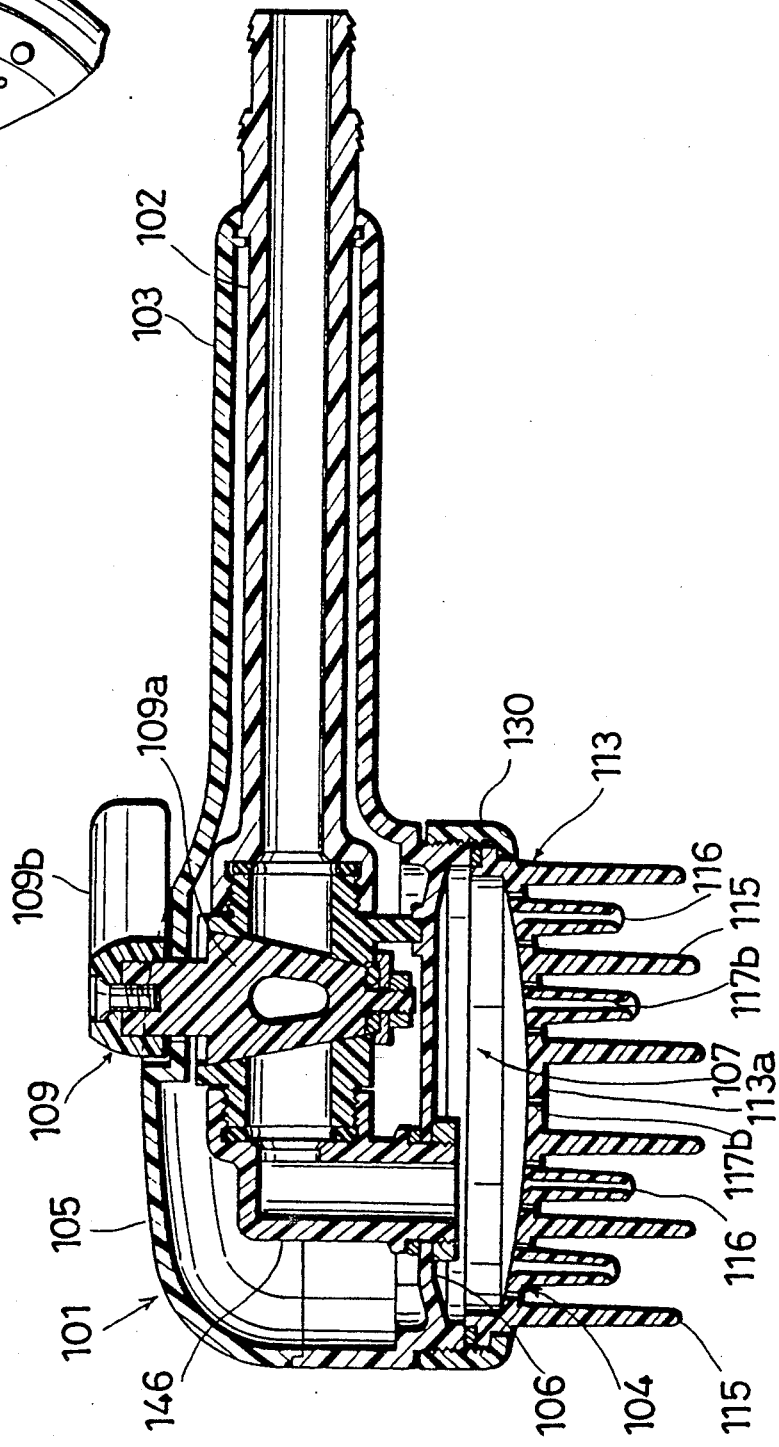
FIG. 5 is a view in vertical section of a second embodiment of the invention.

As will be apparent from FIG. 5, the hollow projections 116 are preferably slightly smaller than the bristles 115 in length.

The brush member 113 of the second embodiment also has a multiplicity of nozzle orifices 117b formed in the base 113a itself.

Figure 7:
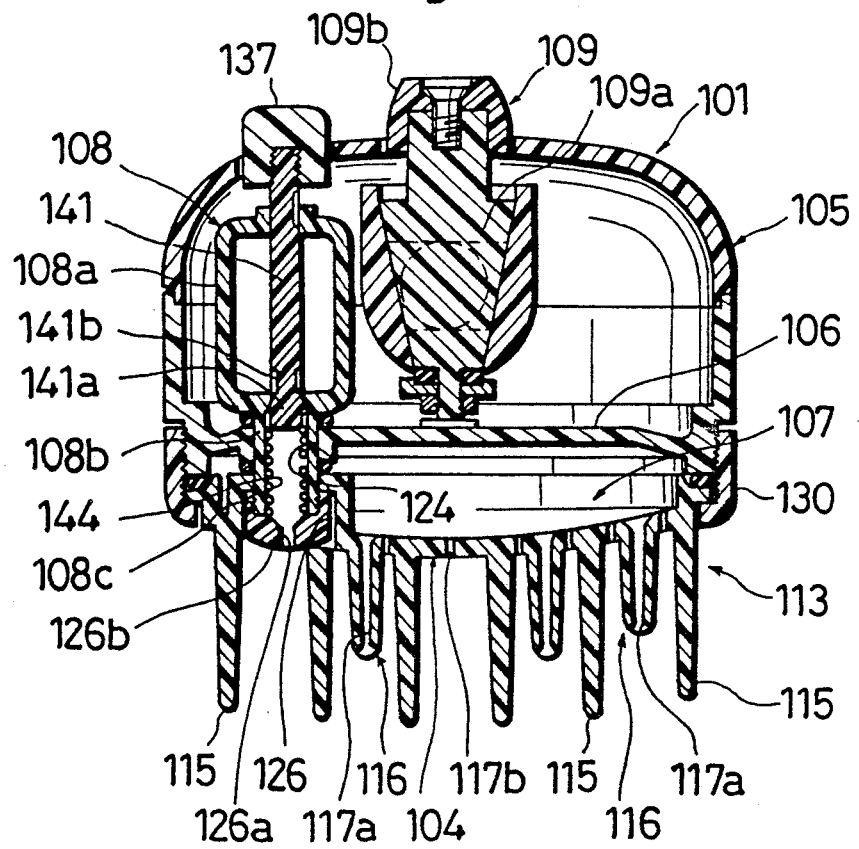
FIG. 7 is a view in section taken along the line VII—VII in FIG. 6.
Figure 8:
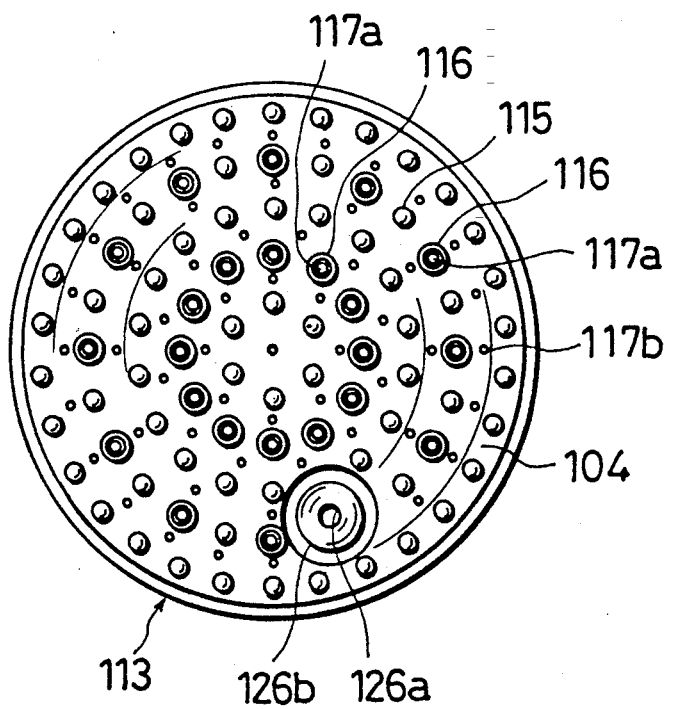
FIG. 8 is a bottom view of a brush member included in the second embodiment.

As will be more apparent from FIG. 7, the shampoo tank 108 for accommodating the shampoo preparation or like liquid is provided in the inside space of the main body container 105.

The shampoo tank 108 of the present embodiment comprises a tank portion 108a positioned on the partition 106, and a tubular portion 108b projecting downward from the tank portion. The tubular portion 108b is inserted through a support hole 124 formed in the partition 106 and inserted in a support cavity 126 formed in a suitable portion of the brush member 113. The tubular portion has an externally threaded lower end 108c, on which a fastening nut 126b formed with a shampoo discharge bore 126a is screwed. In this way, the shampoo tank 108 is supported by the partition 106 and the brush member 113.

The shampoo tank 108 is provided with a valve shaft 141 extending through the tank portion 108a axially thereof and axially slidable. As seen in FIG. 7, the valve shaft 141 is biased upward at all times by a coiled compression spring 144 provided within the tubular portion 108b. The valve shaft 141 is formed at its lower end with a valve body 141a having an outside diameter slightly smaller than the inside diameter of the tubular portion 108b. When the valve shaft 141 is positioned at the upper limit of its stroke, the valve disk 141a at its lower end closes an outlet of the the shampoo preparation or like liquid flows out from the tank portion 108a around a reduced-diameter portion 141b at a suitable part of the shaft, passes through the tubular portion 108b and through the discharge bore 126a of the nut 126b and reaches the lower surface of the brush member 113. Thus, the preparation or like liquid is applied dropwise under gravity.

The valve shaft 141 has a push button 137 attached to its upper end and projecting beyond the top surface of the container 105.

Figure 6:
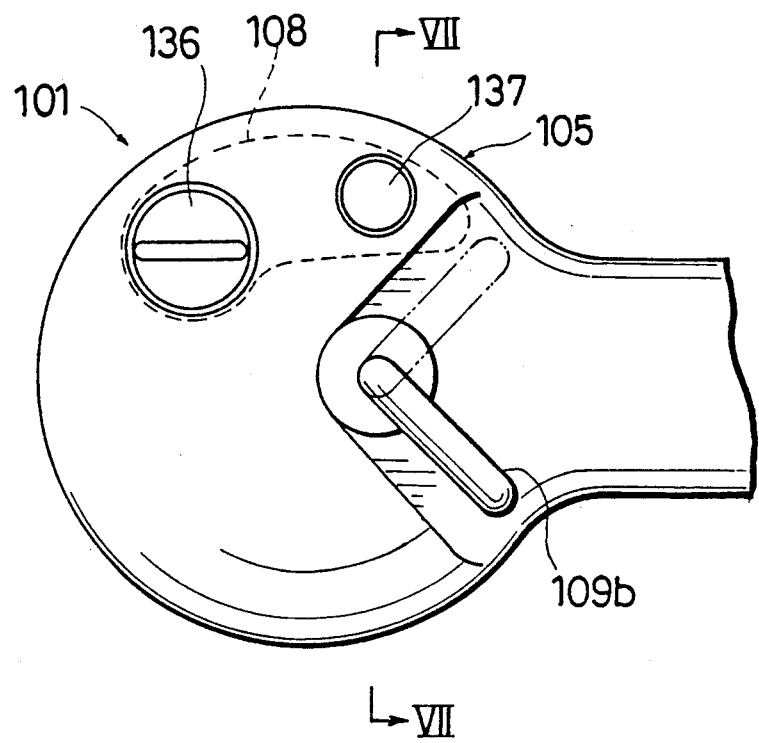
FIG. 6 is a fragmentary plan view of the second embodiment.

Indicated at 136 in FIG. 6 is a closure for closing a replenishing opening of the shampoo tank 108.

When the cock valve 109 is manipulated to pass water through the conduit 102, the water flows through the elbow 146 into the water guide space 107 provided inside the brush member 113 and then jets out in the form of a shower through the nozzle orifices 117b formed in the brush member base 113a and the nozzle orifices 117a at the tips of the hollow projections 116.

The shower can be readily stopped by closing the cock valve 109 with the hand grasping the grip 103.

When the push button 137 is depressed, the shampoo preparation contained in the tank 108 within the main body container 105 can be applied dropwise to the lower surface of the brush member 113.

Like the first embodiment, the shower utensil of the second embodiment of the invention having the foregoing construction is apparently adapted to efficiently and speedily shampoo persons or pet animals having long hair.

The scope of the present invention is of course not limited to the above embodiments. For example, if the brush member 13 or 113 has a sufficient number of hollow projections 16 or 116, the brush member base 13a or 113a need not always be formed with the nozzle orifices 17b or 117b.

The hollow projections 16 or 116, although preferably slightly shorter than the bristles 15 or 115, can be as long as the bristles to achieve the same effect as the foregoing embodiments.

Further with the first embodiment shown in FIGS. 1 to 4, the liquid dispenser means 38 for delivering the liquid from the liquid containing space 8 comprises the valve shaft 41 which is reciprocatingly movable, and the flange 43 provided at an intermediate portion of the valve shaft 41 and serving as a piston for positively forcing out the liquid. However, the flange 43 can be dispensed with, with the valve shaft 41 made merely movable upward or downward to close or open the valve, so as to allow the liquid to flow out of the liquid containing space 8 under gravity. This modification is of course included within the scope of the present invention.

Furthermore, various modifications or alterations based on the principle set forth in the appended claims are all included within the scope of the claimed invention.

I claim:

1. A brush-type shower utensil comprising:
a main body container having a water spray wall;
a water guide space formed within said main body container to adjoin said spray wall, said water guide space being connectable to a water supply source;
bristles projecting outward from said spray wall; and
hollow projections extending outward from said spray wall and communicating with said water guide space, each projection being capable of spraying water therethrough;
wherein said main body container is internally provided with a liquid containing space partitioned from said water guide space;
said main body container being further provided with a liquid dispenser means which comprises a delivery passage extending from said liquid containing space to said water spray wall, the liquid dispenser means further comprising a dispensing valve means which is always urged in one direction under an elastic biasing force;
said valve means including a first portion for closing said delivery passage when said valve means is moved in said one direction under said elastic biasing force, and a second portion for closing said delivery passage when said valve means is moved in the opposite direction against said elastic biasing force beyond a predetermined position,
wherein said first portion of said valve means is a valve body which is cooperative with a valve seat located in said delivery passage, and
wherein said valve means includes a valve shaft extending into said delivery passage, said valve body being provided at one end of said valve shaft, said second portion of said valve means being in the form of a flange provided at an intermediate portion of said valve shaft, said flange being normally urged under said elastic biasing force out of said delivery passage but movable into said delivery passage against said elastic biasing force.

2. The shower utensil according to claim 1, wherein said elastic biasing force is provided by a compression coil spring.

3. The shower utensil according to claim 1, wherein said liquid containing space contains a shampoo preparation.

4. The shower utensil according to claim 1, wherein said bristles are longer than said hollow projections.

5. The shower utensil according to claim 1, wherein said water spray wall is directly formed with nozzle orifices communicating with said water guide space for additionally spraying water.

6. The shower utensil according to claim 1, further comprising a hollow grip connected to said main body container, said grip being provided with a valve for closably opening said water guide space relative to said water supply source.

7. The shower utensil according to claim 1 wherein said flange also works as a bearing for a compression coil spring by which said elastic biasing force is provided.

8. A brush-type shower utensil comprising:
a main body container having a water spray wall;
a water guide space formed within said main body container to adjoin said spray wall, said water guide space being connectable to a water supply source;
bristles projecting outward from said spray wall; and
hollow projections extending outward from said spray wall and communicating with said water guide space, each projection being capable of spraying water therethrough;
wherein said main body container is internally provided with a liquid containing space partitioned from said water guide space;
said main body container being further provided with a liquid dispenser means which comprises a delivery passage extending from said liquid containing space to said water spray wall, the liquid dispenser means further comprising a dispensing valve means which is always urged in one direction under an elastic biasing force;
said valve means including a first portion for closing said delivery passage when said valve means is moved in said one direction under said elastic biasing force, and a second portion for closing said delivery passage when said valve means is moved in the opposite direction against said elastic biasing force beyond a predetermined position,
wherein said liquid containing space is provided by a tank which communicates with said delivery passage through a constricted outlet, said valve means having a valve shaft which is formed with a diametrically reduced portion for separating between said first and second portions of said valve means, said first portion being located within said delivery passage, said second portion being located within said tank.

9. The shower utensil according to claim 8, wherein said elastic biasing force is provided by a compression coil spring.

10. The shower utensil according to claim 8, wherein said liquid containing space contains a shampoo preparation.

11. The shower utensil according to claim 8, wherein said bristles are longer than said hollow projections.

12. The shower utensil according to claim 8, wherein said water spray wall is directly formed with nozzle orifices communicating with said water guide space for additionally spraying water.

13. The shower utensil according to claim 8, further comprising a hollow grip connected to said main body container, said grip being provided with a valve for closably opening said water guide space relative to said water supply source.

14. A brush-type shower utensil comprising:
a main body container having a water spray wall;
a water guide space formed within said main body container to adjoin said spray wall, said water guide space being connectable to a water supply source;
bristles projecting outward from said spray wall; and
hollow projections extending outward from said spray wall and communicating with said water guide space, each projection being capable of spraying water therethrough;
wherein said main body container is internally provided with a liquid containing space partitioned from said water guide space;
said main body container being further provided with a dispensing valve means for delivering a liquid from said liquid containing space to said water spray wall;
said main body container including an elastic inner cover and an outer closure member fitted over said inner cover, said closure member having an opening, said inner cover having an integral push button which bulges out through said opening of said closure member and is elastically deformable;
said dispensing valve means being connected to said push button.

15. The shower utensil according to claim 14, wherein said push button is integrally formed with a boss portion, said dispensing valve means having a valve shaft having one end embedded in said boss portion.

16. A brush-type shower utensil comprising:
a main body container having a water spray wall;
a water guide space formed within said main body container to adjoin said spray wall, said water guide space being connectable t a water supply source;
bristles projecting outward from said spray wall; and
hollow projections extending outward from said spray wall and communicating with said water guide space, each projection being capable of spraying water therethrough;
wherein said main body container is internally provided with a liquid containing space partitioned from said water guide space;
said main body container being further provided with a liquid dispenser means which comprises a delivery passage extending from said liquid containing space to said water spray wall, the liquid dispenser means further comprising a dispensing valve means which is always urged in one direction under an elastic biasing force;
wherein at least one of said hollow projections is formed with a nozzle orifice and an air inlet port, said at least one hollow projection being further provided internally with a negative pressure generator communicating with said water guide space, whereby said negative pressure generator produces a negative pressure when water is passed therethrough, so that air is forcibly introduced into said at least one hollow projection for mixing with water which exists from said nozzle orifice.

17. The shower utensil according to cliam 16, wherein said negative pressure generator comprises a separate nozzle piece inserted into said at least one hollow projection, said nozzle piece having a nozzle which tapers toward said nozzle orifice for accelerating water flow passing through said nozzle.

18. The shower utensil according to cliam 17, wherein said nozzle piece further has a flow regulating means located upstream from said nozzle for imparting a swirling motion to water before passage through said nozzle.

19. The shower utensil according to claim 16, wherein said at least one hollow projection is located centrally of said water spray wall.

* * * * *